United States Patent [19]

Pauwels

[11] 4,326,608
[45] Apr. 27, 1982

[54] TRACTION CONTROL BRAKE ENERGIZER

[75] Inventor: Edward M. Pauwels, South Bend, Ind.

[73] Assignee: The Bendix Corporation, Southfield, Mich.

[21] Appl. No.: 140,284

[22] Filed: Apr. 14, 1980

[51] Int. Cl.³ .............................................. B60T 8/10
[52] U.S. Cl. ................................ 188/181 T; 188/71.9
[58] Field of Search ................. 188/71.9, 72.2, 181 A, 188/181 T, 181 R, 196 BA; 303/112; 180/275

[56] References Cited

U.S. PATENT DOCUMENTS 2,185,003  12/1939  Stoddard ........................ 188/181 T
3,386,537   6/1968  Watanabe ....................... 188/181 T

*Primary Examiner*—Duane A. Reger

*Attorney, Agent, or Firm*—Paul David Schoenle; Ken C. Decker

[57] ABSTRACT

An anti-spin brake energizer includes a friction member pivotally mounted adjacent a brake rotor. A solenoid urges the friction member into engagement with the rotor in response to a spinning wheel condition. The engaged friction member wedges between a piston and the rotor and wedges the piston away from the rotor. The movement of the piston away from the rotor generates a fluid pressure signal in a chamber communicated to the brake to retard the rotation of the rotor to thereby eliminate the spinning condition. A relief valve communicates the chamber with the master cylinder to terminate the fluid pressure signal in response to deactivation of the solenoid and to permit return of the friction member to its rest position spaced apart from the rotor.

9 Claims, 9 Drawing Figures

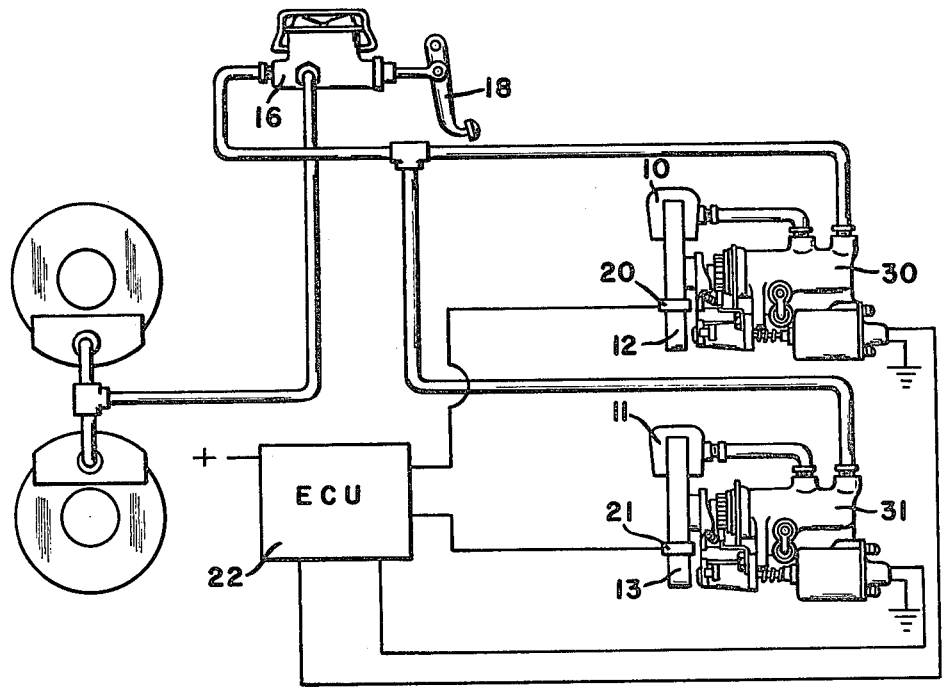
FIG. 1
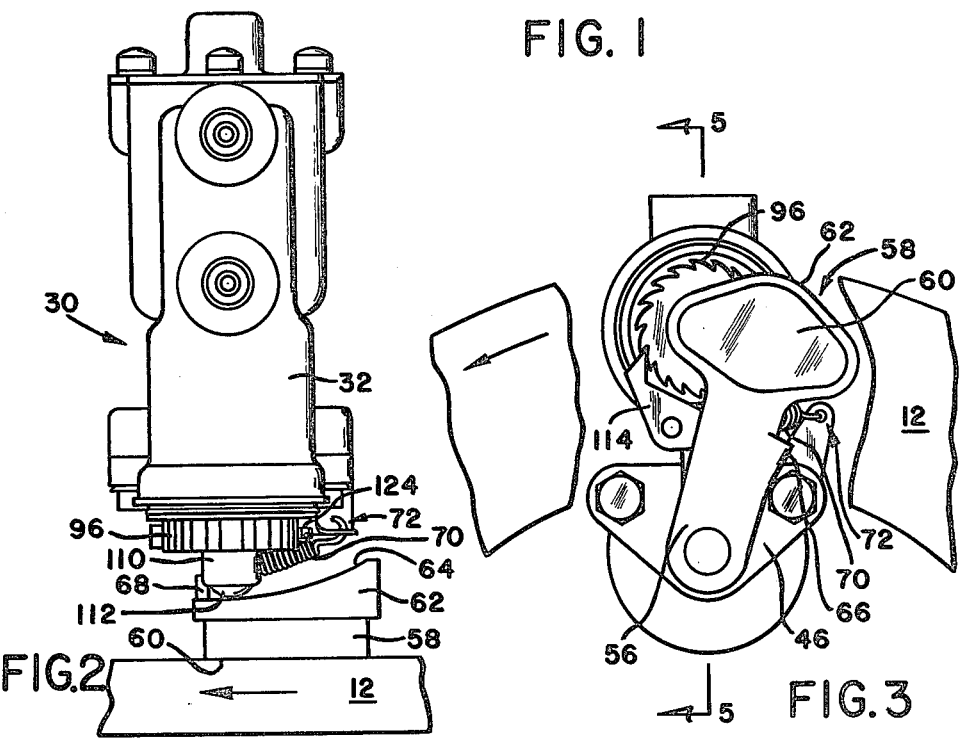
FIG. 2
FIG. 3

TRACTION CONTROL BRAKE ENERGIZER

BACKGROUND OF THE INVENTION

This invention relates to a mechanism for generating a fluid pressure braking signal to apply the brakes of a vehicle in response to a spinning condition of the wheel. In particular, the mechanism makes use of the energy of rotation of the spinning wheel to generate this fluid pressure braking signal.

Conventional vehicle anti-spin systems, such as disclosed in U.S. Application Ser. No. 897,240, now U.S. Pat. No. 4,206,950, operate by applying the brakes to the spinning wheel to retard the rotation of that wheel and thereby eliminate the spinning condition. The energy required to apply the brake is usually obtained directly or indirectly from the vehicle engine via the manifold vacuum, power steering pump, engine or an electric motor driven hydraulic pump. This energy drain decreases the efficiency of the automobile.

SUMMARY OF THE INVENTION

The present invention overcomes the limitations of the prior art by providing a cam or wedge member pivotally mounted between a pressure piston and the brake rotor of a driven wheel. In response to a spinning condition of the wheel, a solenoid urges the cam member with a piston member into engagement with the rotor whereupon the cam member pivots with the rotor and wedges the piston away from the rotor. The movement of the piston generates a fluid pressure braking signal which is communicated to the brake to retard the rotation of the rotor and eliminate the spin condition. The fluid pressure braking signal also reacts upon the cam member to increase the force which wedges the cam member into engagement with the rotor. A relief valve unloads the brake pressure, releases the wedging force, and allows the cam member to return to its rest position upon de-energization of the solenoid. A ratchet and pawl mechanism maintains a controlled spacing between the piston and the cam member to compensate for wear of the friction member.

An advantage of the present invention is that it utilizes the energy of rotation of the spinning wheel to generate the hydraulic pressure necessary to brake the spinning wheel and correct the spin condition.

The present invention requires only a minimal force to initiate actuation of the energizer due to a wedging action of a cam against the brake rotor once initial contact of the cam with the rotor is achieved.

The wear compensating mechanism assures that sufficient movement of the pressure piston is provided without excessive pivoting of the cam.

BRIEF DESCRIPTION OF THE DRAWINGS

FIG. 1 is a schematic view of an anti-spin system incorporating applicant's brake energizer;

FIG. 2 is a top view of applicant's anti-spin brake energizer positioned adjacent a brake rotor;

FIG. 3 is an end view of applicant's mechanism looking from the direction of the brake rotor;

DETAILED DESCRIPTION

Figure 4:
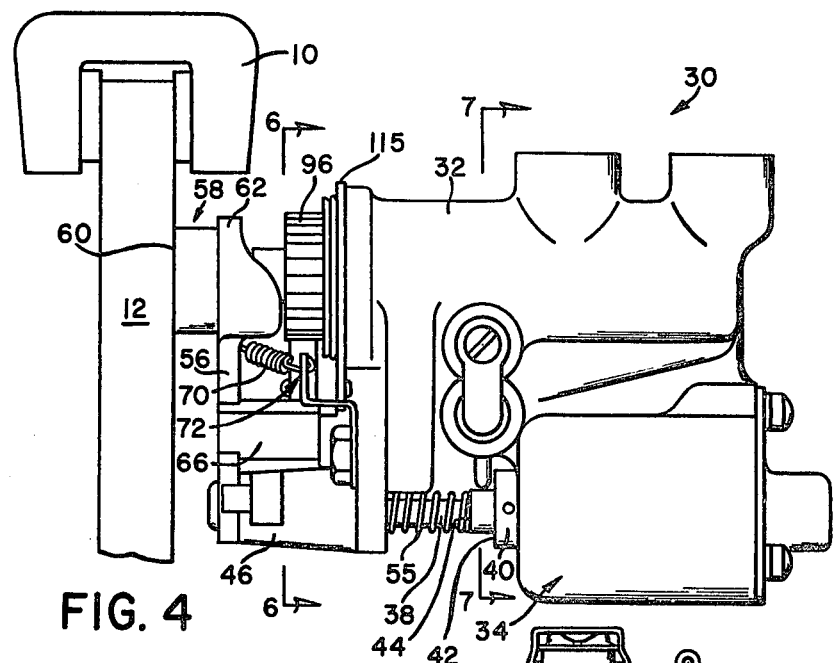
FIG. 4 is a side view of applicant's invention.

Typical disc brake devices 10, 11 retard the rotation of brake rotors 12, 13 connected to driven vehicle wheels 14 (See FIG. 5) in response to fluid pressure braking signals generated by a master cylinder 16 when the vehicle operator makes a brake application through pedal 18. Wheel speed sensors 20, 21 sense the rotation speed of the driven wheels 14. An electronic control unit 22, such as disclosed in U.S. Pat. Nos. 3,487,887 and 3,811,526, is connected to speed sensors 20, 21. Control unit 22 generates signals which represent spinning conditions of the driven wheels 14. These signals are communicated to identical anti-spin brake energizers 30 and 31.

Figure 5:
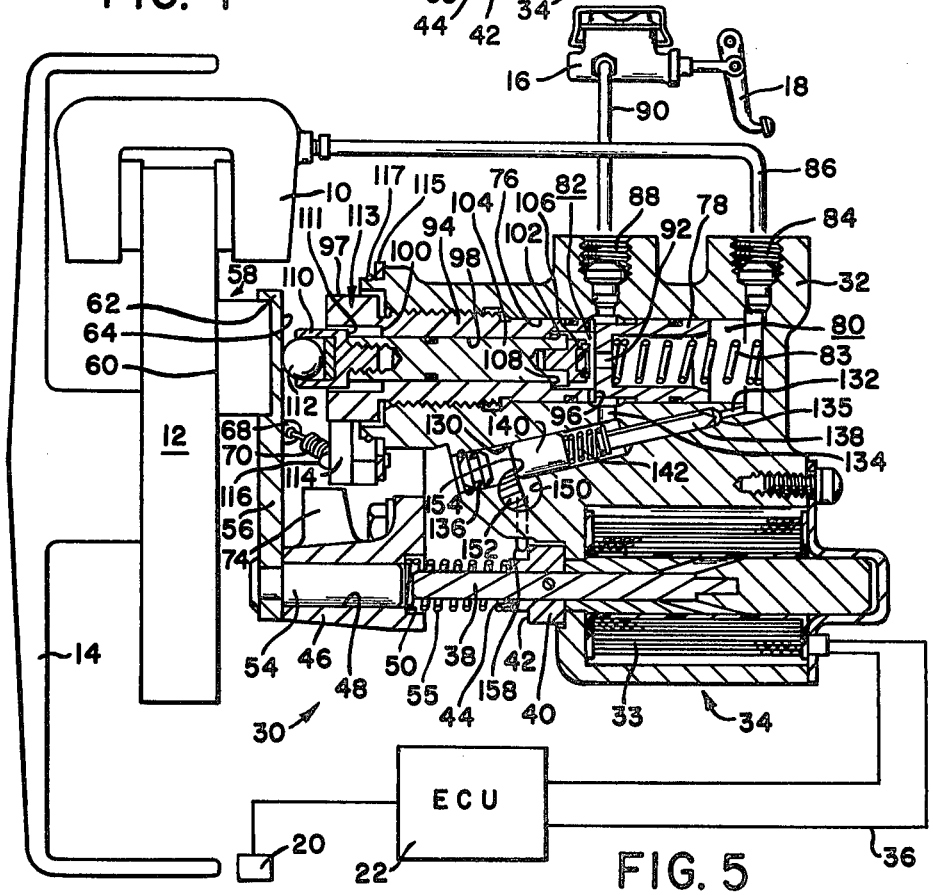
FIG. 5 is a sectional view in the direction of arrows 5—5 of FIG. 3.

Applicant's anti-spin brake energizer 30 includes a housing 32 fixed to the vehicle frame (not shown) adjacent the brake rotor 12, as best shown in FIG. 5. A solenoid 34 is bolted to the housing 32 and is operatively connected to control unit 22 via conductor 36. Solenoid 34 controls the position of plunger 38. Plunger 38 carries a flange 40 which defines a pair of annular shoulders or abutments 42 and 44. A fitting 46 is bolted to the housing 32 and includes a stepped bore 48 with an axis parallel to the axis of rotation of brake rotor 12. The wall of bore 48 defines an annular shoulder 50 against which rests a spring 55. Spring 55 also abuts shoulder 44 and thereby urges plunger 38 away from brake rotor 12.

A rod or fulcrum member 54 is slidably and rotatably mounted in bore 48. One end of arm 56 is connected to rod 54. The other end of arm 56 is connected to a friction member or wedge 58 which includes a friction surface 60 which is engageable with brake rotor 12. The other end of arm 56 also carries a cam member 62 which defines a cam surface 64, the contour of which is best viewed in FIG. 2. A tab 66, best seen in FIGS. 4 and 6, extends from arm 56 and away from brake rotor 12. An eyelet 68 also extends from arm 56. One end of return spring 70 is connected to eyelet 68. The other end of spring 70 is anchored to housing 32 at 72 as best seen in FIGS. 2, 3, and 4. Fitting 46 also includes an abutment 74, best seen in FIGS. 5 and 6, which is engageable with tab 66 to limit the pivoting of arm 56 against the bias of spring 70.

Figure 6:
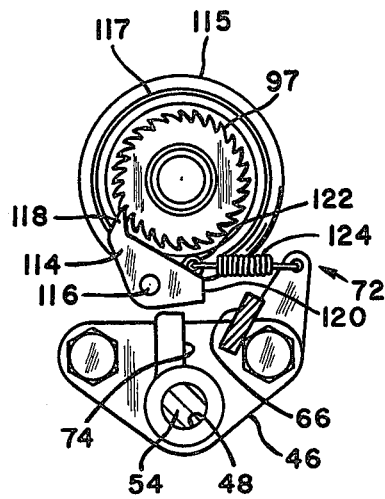
FIG. 6 is a sectional view in the direction of arrows 6—6 of FIG. 4.

Returning to FIG. 5, the housing 32 also includes a bore 76 with an axis parallel to the axis of rotation of rotor 12. A piston 78 slidably mounted in bore 76 divides bore 76 into chambers 80 and 82. A spring 83 in chamber 80 urges piston 78 toward rotor 12. Outlet 84 and conduit 86 connect chamber 80 with brake 10. Inlet 88 and conduit 90 connect chamber 82 with master cylinder 16. A passage 92 in piston 78 communicates chamber 82 with chamber 80. A cylindrical sleeve 94 is threadably mounted within bore 76 and includes at one end an abutment or shoulder 96 which limits the motion of piston 78 toward cam surface 64. The other end of sleeve 94 includes a flange formed into a ratchet wheel 97, as best shown in FIG. 6. Sleeve 94 includes a stepped bore 98 extending therethrough. The wall of bore 98 defines a pair of annular shoulders 100 and 102. A rod 104 is slidably mounted in bore 98. One end of rod 104 supports a seal 106 which is engageable with the surface of piston 78 surrounding passage 92 to prevent communication between chambers 82 and 80. Rod 104 includes a shoulder 108 which is engageable with shoulder 102 of sleeve 94 to limit the motion of rod 104 away from piston 78. The other end of rod 104 holds fitting 110 which rotatably supports a ball bearing 112 for engagement with shoulder 100 to limit the movement of rod 104 away from rotor 12. The rod 104, fitting 110, and bearing 112 act as a follower, indicated by reference numeral 113, to the motion of cam surface 64.

As best seen in FIGS. 5 and 6, a pawl 114 is pivotally mounted on a ring member 115 by a fulcrum pin 116. Ring 115 is rotatably supported on an extended portion of housing 32 and is retained thereto by a snap ring 117. A finger 118 extends from pawl 114 and is engageable with the teeth of ratchet wheel 97. Pawl 114 also includes a shoulder 120 which is engageable with tab 66 on arm 56 upon excessive pivoting of wedge 58. Pawl 114 also includes an eyelet 122 to which is anchored one end of spring 124. The other end of spring 124 is anchored to eyelet 72 so that spring 124 urges pawl 114 and ring 115 in a counter-clockwise manner.

Housing 32 also includes a stepped relief bore 130. A narrow passage 132 communicates an end of bore 130 with chamber 80. Passage 134 communicates chamber 82 with bore 130. Seal 136 isolates bore 130 from the atmosphere. A needle valve 138 is slidably received by the smaller diameter portion of stepped bore 130. An end of needle valve 138 is adapted to engage seat 135 to seal between bore 130 and passage 132. A cylindrical stub 140 is slidably received by the large diameter portion of stepped bore 130. A spring 142 urges needle valve 138 away from stub 140 and toward seat 135.

Figure 7:
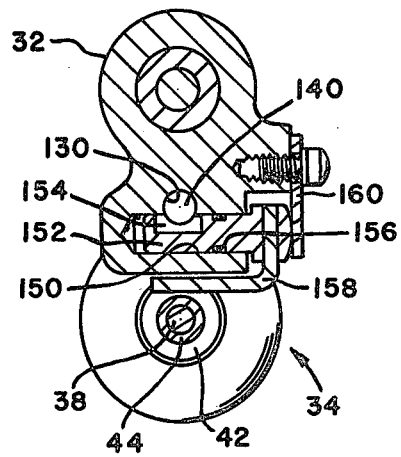
FIG. 7 is a sectional view in the direction of arrows 7—7 of FIG. 4.

As best seen in FIGS. 5 and 7, a cross-bore 150 extends into housing 32 and intersects the large diameter portion of bore 130. A cylindrical cam 152 is rotatably received by cross-bore 150. A sector-shaped notch in cam 152 defines a shoulder 154 which is engageable with an end of stub 140. Seal 156 isolates bores 150 and 130 from the environment. An L-shaped arm 158, best seen in FIG. 7 is fixed at one end thereof to an exterior portion of cam 152. The other end of arm 158 is engageable with shoulder 42 of flange 40 upon actuation of solenoid 34. A retaining finger 160 pinned to housing 32 holds cam 152 within crossbore 150.

Figure 8:
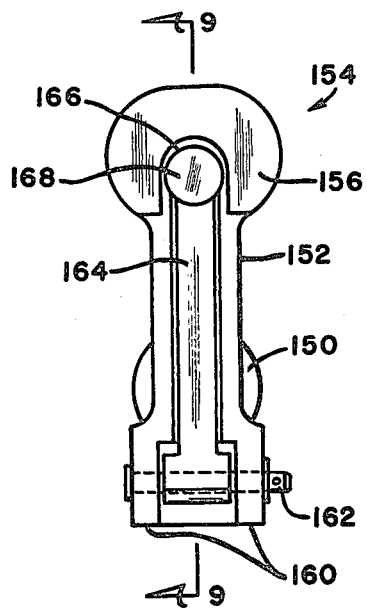
FIG. 8 is an end view of an alternate embodiment of applicant's invention.
Figure 9:
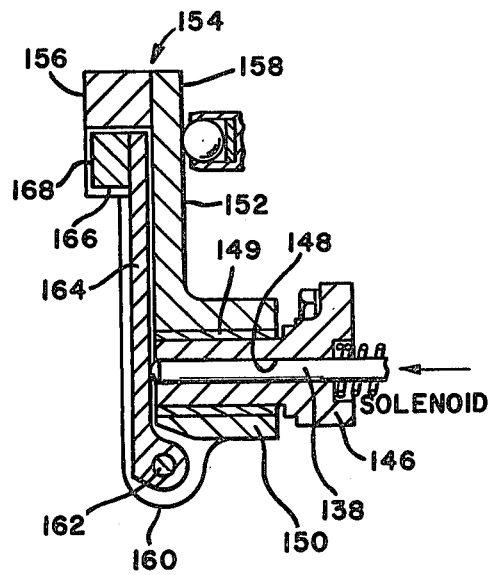
FIG. 9 is a sectional view in the direction of arrows 9—9 of FIG. 8.

An alternate embodiment of a portion of applicant's invention is illustrated in FIGS. 8 and 9. In this embodiment plunger 138 extends from solenoid 34 through bore 148 in fitting 146. The outer cylindrical surface of fitting 146 supports a bushing 149. Bushing 149 slidably and rotatably supports a sleeve 150 from which radially extends an arm 152. An end of arm 152 carries a cam member 154. Cam member 154 includes a large rotor engaging surface 156 and a cam surface 158, similar to the cam surface 64 previously described. The opposite end of arm 152 terminates in a forked portion 160 through which extends a pivot pin 162. An end of an arm 164 is pivotally retained by pin 162 between the forked portions 160 of arm 152. The other end of arm 164 carries a small friction member 166 with a small rotor engaging surface 168. Pin 162 permits arm 164 to pivot with respect to arm 152, but only in a plane perpendicular to a plane defined by the friction surfaces of rotor 12. Pin 162 restrains arms 152 and 164 to pivot together around bushing 149 and around an axis which is parallel to the axis of rotation of rotor 12.

MODE OF OPERATION

When the wheel 14 is not subject to a spin condition, applicant's anti-spin mechanism 30 is in the rest position illustrated in FIG. 5. If the vehicle operator makes a brake application by depressing pedal 18, then master cylinder 16 generates a fluid pressure braking signal which is communicated to brake device 10 via conduit 90, inlet 88, chamber 82, piston passage 92, chamber 80, outlet 84 and conduit 86. This operator-initiated fluid pressure braking signal causes brake 10 to retard the rotation of brake rotor 12 in a well-known manner.

However, when torque is transmitted to the wheel 14 from the drive shaft (not shown) it is possible for the wheel to lose traction with the road surface and begin spinning. Control unit 22 senses the spinning condition through wheel speed sensor 20 and communicates an actuating spin signal representing the spinning condition to armature 33 of solenoid 34 via connector 36. Solenoid 34 slides plunger 38 and flange 40 toward brake rotor 12 against the bias of spring 55 in response to the spin signal. As flange 40 moves toward rotor 12, shoulder 42 pivots arm 158 and cam member 152 clockwise viewing FIG. 5. This causes shoulder 154 to slide stub 140 and needle valve rod 138 toward seat 135. When valve rod 138 engages seat 135 communication is shut off between chambers 80 and 82 via stepped bore 130.

As plunger 38 continues its motion toward rotor 12, it also engages rod 54 and moves rod 54, arm 56 and friction member 58 toward rotor 12 and against the bias of spring 70. When surface 60 of friction member 58 engages the rotating rotor 12, the friction therebetween drags friction member 58 in the direction of rotation of rotor 12, thus pivoting friction member 58 and cam surface 64 about rod 54 against the bias of spring 70. This friction causes friction member 58 and cam surface 64 to be wedged leftward, viewing FIG. 2, between rotor 12 and bearing 112, thus causing bearing 112 and fitting 110 of follower 113 to move away from rotor 12. Returning to FIG. 5, as follower 113 moves away from rotor 12, seal 106 engages piston 78 and prevents fluid communication between chamber 80 and master cylinder 16 via piston passage 92, chamber 82 and conduit 90. Continued pivoting of cam surface 64 causes follower 113 to move piston 78 away from rotor 12, thus compressing the fluid in chamber 80. The resulting increased fluid pressure in chamber 80 comprises the anti-spin fluid pressure braking signal which is communicated to the brake 10 via conduit 86 to retard the rotation of rotor 12 to eliminate the spinning condition of wheel 14. The increased pressure in chamber 80 also reacts through piston 78, and follower 113 to increase the force which wedges member 58 between bearing 112 and rotor 12. This, in turn, increases the amount of friction between rotor 12 and friction surface 64, thus increasing the amount of torque transferred from rotor 12 into the pivoting of wedge 58 and cam surface 64. In this manner, due to the wedging action of friction member or wedge 58 between rotor 12 and follower 113, the major portion of the energy required to produce the anti-spin fluid pressure braking signal is extracted from the energy of rotation of rotor 12. Only a small amount of energy is required by solenoid 34 to move friction member 58 initially against the bias of springs 70 and 55 and into engagement with rotor 12. The size of piston 78 and the contour of cam surface 64 are matched to the vehicle brake system characteristics so that only a portion of the available travel of wedge 58 and of follower 113 is utilized to effectively correct the spin condition. In this manner, the spin condition is corrected and the energizer 30 is deactivated before shoulder 111 of follower 113 engages shoulder 100 of sleeve 94, thus preventing a situation wherein the wedging action cannot be relieved by the release of fluid pressure from chamber 80.

When the spinning condition has been eliminated control unit 22 deactivates solenoid 34 and spring 55 moves plunger 38 and flange 40 away from rotor 12. This permits arm 158 and cam 152 to pivot counterclockwise viewing FIG. 5, thus allowing needle valve 138 to move away from valve seat 135. This opens communication between chamber 80 and master cylinder 16 via passage 132, bore 130, passage 134, chamber 82, inlet 88 and conduit 90, and relieves or decreases the fluid pressure in chamber 80. The release of pressure in chamber 80 allows piston 78 and follower 113 to move away from rotor 12, thus terminating the wedging action of surface 60 against rotor 12 and allowing spring 70 to pivot wedge 58 out of engagement with rotor 12 and back to its rest position.

The friction between rotor 12 and friction member 58 naturally causes reduction in thickness of friction member or wedge 58 due to wear. Viewing FIG. 2, it can be seen that a thickness reduction of wedge 58 requires wedge 58 to pivot further to the left to produce the same stroke of piston 78 and follower 113 as is produced by an unworn wedge 58. To compensate for this situation, applicant has provided a wear adjuster mechanism, the operation of which is best understood with reference to FIGS. 4, 5, and 6. Normally, wedge 58 pivots about fulcrum 54 and slides piston 78 and follower 113 away from rotor 12 until further movement is resisted by the build-up of pressure in chamber 80. This point is normally reached before tab 66 engages shoulder 120 of pawl 114. However, excessive wear of wedge 58 will cause wedge 58 to pivot until tab 66 engages shoulder 120 of pawl 114 before the pressure in chamber 80 prevents further pivoting. The engagement of tab 66 with pawl 114 causes pawl 114 and ring 115 to rotate clockwise viewing FIG. 6, thus causing a similar rotation of ratchet wheel 96 and sleeve 94 through the engagement of finger 118 of pawl 114 with ratchet wheel 96. This screws sleeve 94 out of housing 32 toward rotor 12. Sleeve 94 remains in this new position nearer rotor 12 after energizer 30 has been deactivated and wedge 58 has pivoted back to its rest position. The new position of sleeve 94, and thus of shoulder 96, allows piston 78 to assume a new rest position nearer to wedge 58 under the influence of spring 83. In this manner, a substantially constant spacing is maintained between piston 78 and cam surface 64 of wedge 58 when the wedge 58 is in engagement with rotor 12. This constant spacing assures that the travel of piston 78 will be sufficient to generate the anti-spin fluid pressure braking signal without the extraordinary pivoting of wedge 58.

With respect to the alternate embodiment illustrated in FIGS. 8 and 9, actuation of solenoid 34 urges rod 138 into engagement with small arm 164, thus pivoting small arm 164 counterclockwise, viewing FIG. 9, and relative to large arm 168, about pin 162 and about an axis perpendicular to the rotation axis of rotor 12, and thus pivoting surface 168 of small friction member 166 into engagement with rotor 12. The friction between friction surface 168 and rotating rotor 12 causes both arms 164 and 152 both friction members 154 and 166 to pivot in the direction of rotation of rotor 12 around bushing 149 due to their connection by pin 162. Cam surface 158 of large friction member 154 then engages bearing 112 of follower 113, thus causing a wedging action of friction member 154 between rotor 12 and follower 113 similar to the wedging action of wedge 58 previously described. This wedging action forces follower 113 and piston 78 away from rotor 12 to produce the anti-spin fluid pressure braking signal. However, a smaller and less powerful solenoid is required with this embodiment since only small arm 164 need be pivoted by rod 138 to initiate the wedging action and produce the resulting anti-spin fluid pressure braking signal.

The drawings show a wedge configuration or cam surface 64 which works in only one direction of wheel rotation. If desired, the cam surface 64 could be made symetrical in the direction of rotation of rotor 12 to provide anti-spin operation in response to both forward and reverse spinning wheels.

I claim:

1. In a wheeled vehicle having a rotatable member connected to a vehicle wheel, a brake engageable with the rotatable member for retarding the rotation of the rotatable member in response to fluid pressure braking signals, and control means for generating spin signals in response to a spin condition of the wheel, an anti-spin mechanism comprising:

a friction member engageable with the rotatable member independent of the brake;

actuating means for urging the friction member into engagement with the rotatable member in response to the spin signal, the engagement of the friction and rotatable members causing a motion of the friction member in response to rotation of the rotatable member;

generating means connected to the friction member for generating an anti-spin fluid pressure braking signal in response to the motion of the friction member;

the brake retarding the rotation of the rotatable member to eliminate the wheel spin condition in response to the anti-spin fluid pressure braking signal; and a housing fixed adjacent the rotatable member, the friction member comprising an arm with one end portion engageable with the actuating means and slidably and rotatably mounted on the housing, and with an other end portion supporting the friction member, the one arm portion sliding so that the friction member translates into engagement with the rotatable member upon actuation of the actuating means, friction between the friction member and the rotatable member causing the engaged friction member to pivot about the housing in response to rotation of the rotatable member.

2. The anti-spin mechanism of claim 1, wherein: the friction member further comprises a cam surface defined thereupon, the housing including a bore defined therewithin, and the generating means comprising a piston slidably mounted within the bore, the wall of the bore and the piston defining an outlet chamber therebetween communicated with the brake via the passage means, a follower slidably mounted in the bore between the cam surface and the piston, the follower and the piston moving away from the rotatable member in response to the pivoting of the friction member, moving the piston compressing fluid in the outlet chamber and in the brake thereby generating the anti-spin fluid pressure braking signal.

3. The wheeled vehicle of claim 2, further comprising a master cylinder for generating an operator fluid pressure braking signal in response to an operator input signal, the piston and the wall of the bore also cooperating to define an inlet chamber therebetween communicated with the master cylinder, the piston including a piston passage therethrough communicating the outlet chamber with the inlet chamber, and sealing means disposed between the piston and the follower for preventing fluid communication through the piston passage as the follower moves away from the rotatable member.

4. The invention of claim 2, further comprising: a bypass passage normally communicating the outlet chamber with the inlet chamber to prevent generation of the anti-spin fluid pressure braking signal, and valve means coupled to the actuating means for preventing fluid communication through the bypass passage in response to actuation of the actuating means.

5. The invention of claim 2, wherein:
the second bore has an axis which is substantially parallel to the axis of the rotatable member.

6. In a wheeled vehicle having a rotatable member connected to a vehicle wheel, a brake engageable with the rotatable member for retarding the rotation of the rotatable member in response to fluid pressure braking signals, and control means for generating spin signals in response to a spin condition of the wheel, an anti-spin mechanism comprising:
a friction member engageable with the rotatable member independent of the brake;
actuating means for urging the friction member into engagement with the rotatable member in response to the spin signal, the engagement of the friction and rotatable members causing a motion of the friction member in response to rotation of the rotatable member;
generating means connected to the friction member for generating an anti-spin fluid pressure braking signal in response to the motion of the friction member;
the brake retarding the rotation of the rotatable member to eliminate the wheel spin condition in response to the anti-spin fluid pressure braking signal;
resilient means biased to urge the piston toward the cam surface;
a cylindrical sleeve surrounding the follower and threadably mounted in the bore, the sleeve defining an abutment thereupon for limiting movement of the piston toward the cam surface and having a portion comprising a ratchet wheel;
a ring rotatably mounted on the housing;
a pawl pivotally mounted on the ring and engageable with the ratchet wheel; and
a tab fixed relative to the friction member; the tab being engageable with the pawl upon excessive pivoting of the friction member, the pawl and the ring rotating in response to engagement of the pawl and tab, the ratchet wheel and the sleeve moving toward the cam surface in response to the rotation of the ring and pawl to thereby maintain a predetermined spacing between the piston and the cam surface.

7. In a wheeled vehicle having a rotatable member connected to a vehicle wheel, a brake engageable with the rotatable member for retarding the rotation of the rotatable member in response to fluid pressure braking signals, and control means for generating spin signals in response to a spin condition of the wheel, an anti-spin mechanism comprising:
a friction member engageable with the rotatable member independent of the brake;
actuating means for urging the friction member into engagement with the rotatable member in response to the spin signal, the engagement of the friction and rotatable members causing a motion of the friction member in response to rotation of the rotatable member;
generating means connected to the friction member for generating an anti-spin fluid pressure braking signal in response to the motion of the friction member;
the brake retarding the rotation of the rotatable member to eliminate the wheel spin condition in response to the anti-spin fluid pressure braking signal; and
resilient means biased to urge the friction member away from the rotatable member.

8. In a wheeled vehicle having a rotatable member connected to a vehicle wheel, a brake engageable with the rotatable member for retarding the rotation of the rotatable member in response to fluid pressure braking signals, and control means for generating spin signals in response to a spin condition of the wheel, an anti-spin mechanism comprising:
a friction member engageable with the rotatable member independent of the brake;
actuating means for urging the friction member into engagement with the rotatable member in response to the spin signal, the engagement of the friction and rotatable members causing a motion of the friction member in response to rotation of the rotatable member;
generating means connected to the friction member for generating an anti-spin fluid pressure braking signal in response to the motion of the friction member;
the brake retarding the rotation of the rotatable member to eliminate the wheel spin condition in response to the anti-spin fluid pressure braking signal; and
resilient means biased to urge the friction member away from the rotatable member and biased to pivot the friction member in a direction opposite the direction of rotation of the rotatable member.

9. In a wheeled vehicle having a rotatable member connected to a vehicle wheel, a brake engageable with the rotatable member for retarding the rotation of the rotatable member in response to fluid pressure braking signals, and control means for generating spin signals in response to a spin condition of the wheel, an anti-spin mechanism comprising:
a friction member engageable with the rotatable member independent of the brake;
actuating means for urging the friction member into engagement with the rotatable member in response to the spin signal, the engagement of the friction and rotatable members causing a motion of the friction member in response to rotation of the rotatable member;
generating means connected to the friction member for generating an anti-spin fluid pressure braking signal in response to the motion of the friction member;

the brake retarding the rotation of the rotatable member to eliminate the wheel spin condition in response to the anti-spin fluid pressure braking signal; and the friction member comprising, a base rotatably and slidably mounted on the housing, a first friction member portion with a rotor engaging surface and with a cam surface engageable with the generating means, a first arm interconnecting the base with the first friction member portion, a second friction member portion with a rotor engaging surface, a second arm engageable with the actuating means and extending from the second friction member portion to an end pivotally attached to the base so that the second friction member portion is pivotable relative to the first friction member portion and into engagement with the rotatable member upon actuation of the actuating means.

* * * * *